United States Patent
Paredes Salazar et al.

(10) Patent No.: US 11,457,656 B2
(45) Date of Patent: Oct. 4, 2022

(54) DOUGHY HOMOGENEOUS MIXTURE FOR SEASONING FOODS

(71) Applicant: Fabrica de Especias y Productos el Rey S.A., Bogota (CO)

(72) Inventors: Juan Carlos Paredes Salazar, Bogota (CO); Luis Carlos Barrantes Crespo, Bogota (CO)

(73) Assignee: Fabrica De Especias Y Productos El Rey S.A., Bogota (CO)

(*) Notice: Subject to any disclaimer, the term of this patent is extended or adjusted under 35 U.S.C. 154(b) by 0 days.

(21) Appl. No.: 13/800,696

(22) Filed: Mar. 13, 2013

(65) Prior Publication Data

US 2013/0202776 A1  Aug. 8, 2013

Related U.S. Application Data

(62) Division of application No. 12/996,132, filed as application No. PCT/IB2009/005909 on Jun. 5, 2009, now Pat. No. 10,993,467.

(30) Foreign Application Priority Data

Jun. 6, 2008 (CO) .................................. 08057850
Jun. 6, 2009 (WO) ............................... 2009147520

(51) Int. Cl.
```
A23L 27/10    (2016.01)
A23L 29/212   (2016.01)
A23L 19/00    (2016.01)
A23L 27/12    (2016.01)
A23L 29/269   (2016.01)
A23L 29/256   (2016.01)
```

(52) U.S. Cl.
CPC ............. *A23L 29/212* (2016.08); *A23L 19/09* (2016.08); *A23L 27/10* (2016.08); *A23L 27/12* (2016.08); *A23L 29/256* (2016.08); *A23L 29/27* (2016.08)

(58) Field of Classification Search
USPC ........................................................ 426/549
See application file for complete search history.

(56) References Cited

U.S. PATENT DOCUMENTS

| | | | | |
|---|---|---|---|---|
| 3,350,208 A * | 10/1967 | Colby | ................. | A21D 2/02 426/283 |
| 4,931,297 A * | 6/1990 | Malyniak | ............... | A23L 3/3481 426/265 |
| 5,104,670 A * | 4/1992 | Endico | ................... | 426/330.6 |
| 5,332,587 A * | 7/1994 | Howard | ................. | A23L 3/3508 426/128 |
| 5,503,863 A * | 4/1996 | Brain | ...................... | A23L 1/064 426/573 |
| 6,284,303 B1 * | 9/2001 | Rowe | ....................... | A23L 2/52 426/628 |
| 6,558,730 B1 * | 5/2003 | Gisaw | ....................... | A23L 7/13 426/438 |
| 2005/0106292 A1 * | 5/2005 | Huber | ...................... | A21D 2/02 426/106 |
| 2006/0115518 A1 * | 6/2006 | Tsuchiya | ............... | A61K 31/198 424/439 |
| 2007/0042098 A1 * | 2/2007 | Norquist | ................ | A21D 6/001 426/549 |
| 2007/0134397 A1 * | 6/2007 | Eppler | .................... | A23P 10/28 426/589 |
| 2007/0184160 A1 * | 8/2007 | Josef et al. | ................... | 426/496 |
| 2008/0032029 A1 * | 2/2008 | Aquino | ................ | A23D 7/0053 426/589 |
| 2009/0208607 A1 * | 8/2009 | Bunke et al. | ................... | 426/87 |

FOREIGN PATENT DOCUMENTS

| | | | | |
|---|---|---|---|---|
| DE | WO 2007068402 A1 | * | 6/2007 | ............. A23L 23/10 |
| KR | 20060103063 | * | 10/2007 | |
| WO | WO-2005011408 A1 | * | 2/2005 | ............. A23L 23/00 |

OTHER PUBLICATIONS

Igoe et al., Dictionary of Food Ingredients Chapman and Hall 1996, pp. 3, 81, 122, and 137.*
Potter et al Food Science 5th Edition Chapman and Hall 1995 p. 478.*
Igoe et al, Dictionary of Food Ingredients, 3rd Edition Chapman and Hall 1997, p. 14.*
Igoe et al Dictionary of Food Ingredients pp. 3, 14, 35, and 81. Chapman and Hall 1997.*
Ikerd "The New American Food Economy" Organic Farming Research Foundation 1999 http://web.missouri.edu/ikerdj/papers/SFT-New%20Food%20Movement.htm pp. 1-3.*
Food and Agricultural Industry "9.8.3 Pickles, Sauces and Salad Dressings" pp. 1-4, Aug. 1995 https://www3.epa.gov/ttn/chief/ap42/ch09/final/c9s08-3.pdf (Year: 1995).*
Publix"El Rey Garlic Pasta Blend" pp. May 1-2, 2019 https://www.publix.com/pd/el-rey-garlic-blend/RIO-PCI-333073 (Year: 2019).*

(Continued)

*Primary Examiner* — Jenna A Watts
(74) *Attorney, Agent, or Firm* — Porzio Bromberg & Newman P.C.

(57) ABSTRACT

The present invention lies in the food field. In particular the present invention relates to a novel food-seasoning product constituted by specific compounds of 100% natural origin, organic or non-organic, in defined proportions conferring thereon a homogeneous doughy consistency, rendering it a highly desirable product for the consumer. Currently, health and care of one's body are indispensable for the modern person and the availability of a product for seasoning food and containing solely components of 100% natural origin, organic or non-organic, renders it an attractive product for the consumer. In addition the novel product of the present invention exhibits improved stability and extended average life, does not require refrigeration prior to being opened and exhibits excellent organoleptic properties in comparison with commercially-available seasoning products. Additionally the present invention provides a novel process for obtainment of the seasoning product defined by a disposition of stages and specific reaction conditions such that the product possesses full advantages over conventional products of this type.

6 Claims, No Drawings

(56) References Cited

OTHER PUBLICATIONS

Zhang et al. "Determination of Quality Parameters of Tomato Paste Using Guided Microwave Spectroscopy." Food Control 40 (2014), 214-223.
Bostwick Consistometer ZYCON Technical Data, downloaded from http://www.industrial-needs.com/technical-data/bostwick-consistormeter-zycon.htm, accessed on May 18, 2015, pp. 1-3.

* cited by examiner

DOUGHY HOMOGENEOUS MIXTURE FOR SEASONING FOODS

CROSS REFERENCE TO RELATED APPLICATION

This application is a divisional of U.S. patent application Ser. No. 12/996,132 filed Mar. 30, 2011 which issued May 4, 2021 as U.S. Pat. No. 10,993,467, which is a National Stage of International Application No. PCT/IB2009/005909, filed Jun. 6, 2009, which claims the benefit of Application No. 08-057850, filed in Colombia on Jun. 6, 2008, the disclosures of which Applications are incorporated by reference herein.

FIELD OF THE INVENTION

The present invention is related to the food field. Specifically, the present invention is related with a novel product based on a homogeneous mixture of doughy consistency for seasoning foods exhibiting high stability, extended life span improved organoleptical properties even the components are 100% natural, organic or non-organic, and its refrigeration is not required before to be opened, which makes a high desirable product to the consumer over the seasoning products commercially available.

BACKGROUNDS OF THE INVENTION

In the state of the art, it is well known the existence of products for seasoning foods which are used by the consumer for providing taste to the foods or to make them more attractive. Indeed, since ancient times, condiments and/or spices had been used in their natural state for these purposes by humanity. Nevertheless, in recent times, consumers require a seasoned product ready to serve, without the needing to use fruits, condiments or herbs in its natural state which may be a prolonged or undesirable process for seasoning foods. Since a few decades ago, consumers have diverse seasoning products ready to serve which are made from products based on fruits, spices or herbs exhibiting organoleptical properties very pleasant to the palate. However, in many times, such products are rejected due to the fact that they contain a great amount of artificial additives or artificial excipients. It is well known by those experts in foods that those products containing natural components are of difficult handling in the industry and, thus, they require auxiliary elements that allow the processing of said natural components. These artificial additives often significantly reduce the seasoning properties of the product and, frequently, they result harmful for the consumer's health. Therefore, although seasoning products are available ready to serve, the modern consumer has the tendency to reject them due to the presence of artificial additives and the product does no exhibit desirable organoleptical properties. In the state of the art exists several documents related with seasoning products and process for preparing thereof. For instance, there are edible compositions with improved stabilities including spices or condiments such as onion, garlic, among others, for seasoning foods. In the same manner, many food concentrates or supplementary are available based on natural components. Nevertheless, those skilled in the art, also know that said products, even are labeled as 100% natural products, contain significant amount of additives and artificial excipients, which are components greatly rejected by the consumer. In addition, such products based on natural ingredients exhibit low stability or short life span and they require refrigeration before being opened, which is not practical for its production in the industry and marketing. Accordingly, to prepare a seasoning product of doughy and homogeneous consistency, based on 100% natural, organic, or non-organic ingredients, is for the manufacturer a colossal work, due to the high difficult degree in the handling and processing the natural ingredients at industrial level. On the other hand, the traditional process for preparing conventional seasoning products is laborious and highly expensive, undesirable for the manufacturer.

Accordingly, it is clear that in the state of the art exists the urgent needing for novel seasoning products that overcome the disadvantages of those products commercially available, as discussed above. Consumers require a seasoning product based on 100% natural, organic, or non-organic ingredients, without artificial additives, of good appearance, highly desirable to the palate during its use, with improved stability, prolonged life span and which refrigeration is not required before being opened.

DETAILED DESCRIPTION OF THE INVENTION

The present invention intends to solve many of the existing disadvantages of the seasoning products currently available. Particularly, the applicant has focused the efforts for developing a product having the following technical aspects:
Life Span
Doughy products, commercially available having natural preservatives have life span ranging between 3 and 6 months, and the needing to be kept refrigerated and/or frozen. This life span is very short when it is required to implement the product up to a broad commercialization level.
Preservatives
In the market does not exist products having a natural preservative, as those used in the product of the present invention, in which refrigeration is not required before they are opened. More used preservatives are Sorbates and Sodium Benzoate, which originated from artificial source, and are regulated by doses because they have harmful effects on health, lower cost and a good anti microbial-spectrum. In this aspect, the innovation relies on selecting a preservative, having natural degree and wherein its dose not alters the flavor, aroma and color. In the same way, a preservative that it is not harmful for health, that comply with the effects required to perform a high anti microbial efficiency, and also exhibits resistance to the thermal treatment performed during the process.
Thermal Treatment:
To select a temperature and exposure time ranges that avoid significant changes in the properties of the ingredients comprising the doughy product, or affecting the final product and thus complying the acceptable levels of microbiological quality.
Doughy Product
This product is preserved by means of using ingredients from 100% natural, organic, or non-organic source, securing acceptable levels of quality providing it a significant life span without greatly exhibit sensorial, microbiological or physicochemical changes.

Thus, the applicant had developed a novel seasoning product for seasoning foods having ingredients from 100% natural, organic and non-organic source, and exhibiting excellent sensorial properties, improved stability, prolonged life span up to 12 months, and refrigeration is not required before being opened.

In order to achieve these purposes, the present invention provides a novel doughy homogeneous mixture based on 100% natural, organic, or non-organic ingredients for food seasoning.

Thus, a first object of the present invention is a doughy homogeneous mixture having 100% natural, organic, or non-organic components as food seasoning, characterized by comprising the following components:
(i) Fresh, organic or non-organic fruits
(ii) Water;
(iii) Salt;
(iv) Carbohydrates; and
(v) Natural Preservatives.

In a second object, the present invention provides a doughy homogeneous mixture containing 100% natural, organic, or non-organic ingredients as food seasoning, characterized by comprising the following components:
(i) Fresh fruits and dehydrated, organic or non-organic fruits
(ii) Water;
(iii) Salt;
(iv) Carbohydrates; and
(v) Natural Preservatives.

The fresh fruits and/or dehydrated, organic or non-organic forming the mixture of the present invention may be selected from the group consisting, among others, from garlic, onion, coriander, cayenne pepper, thyme, basil, oregano, scallion, tarragon, rosemary, chili and mixtures thereof.

In one preferred embodiment, the fresh fruits and/or dehydrated, organic or non-organic forming the mixture of the present invention are selected from the group consisting, among others, from onion, basil or cayenne pepper.

In other more preferred embodiment of the present invention, the fresh fruits and/or dehydrated, organic or non-organic correspond to onion.

In other more preferred embodiment of the present invention, the fresh fruits and/or dehydrated, organic or non-organic correspond to basil.

In other more preferred embodiment of the present invention, the fresh fruits and/or freeze-dry fruits and/or dehydrated fruits, organic or non-organic correspond to cayenne pepper.

Dehydrated fruits are achieved by means of any treatment allowing a humidity level lower than 14%, e.g., heating, lyophilization or zeodehydratation, among others.

The carbohydrates present in the mixture of the present invention are those providing a doughy consistency and they are from 100% natural, organic, or non-organic source. In a preferred embodiment, the mixture of the present invention is characterized by the carbohydrates selected from the group consisting of natural starch and xanthan gum. In other more preferred embodiment, the mixture of the present invention is characterized by the carbohydrates selected from the group consisting of natural starch, xanthan gum and carrageenan.

In a preferred embodiment, the natural preservatives organic or non-organic are selected from lactic acid, acetic acid, citric acid and ascorbic acid.

In a more preferred embodiment, the natural preservatives are selected from lactic acid and acetic acid.

In other preferred embodiment, the mixture of the present invention optionally may include 100% natural, organic or non-organic edulcorants. These edulcorants can be selected from, for instance, sucrose, dextrose, fructose, *stevia*.

In other more preferred embodiment, the mixture of the present invention the edulcorant is selected from sucrose.

In other embodiment, the mixture of the present invention may optionally include essential oils of the fresh or dehydrated fruits itself to enhance the sensorial characteristics of the mixture.

In a preferred embodiment of the first object of the present invention, the doughy homogeneous mixture, having 100% natural, organic, or non-organic ingredients, is characterized by the fresh fruits are present in a proportion from 75 to 85%, water is present in a proportion from 10% to 15%, salt is present in a proportion from 2.5 to 4.0%, the carbohydrates are present in a proportion from 1.5 to 3.0%, and the natural preservatives are present in a proportion from 0.5 to 1.5%.

In a more preferred embodiment of the first object of the present invention, the doughy homogeneous mixture having 100% natural, organic, or non-organic ingredients, it is characterized by the fresh fruits present in a proportion from 75 to 85%, water is present in a proportion from 10% to 15%, salt is present in a proportion from 2.5 to 4.0%, the carbohydrates correspond to natural starch present in a proportion from 1.4 to 2.5%, and xanthan gum present in a proportion from 0.1 to 0.5%; the natural preservatives correspond to lactic acid present in a proportion from 0.5 to 0.9% and acetic acid present in a proportion from 0.4 to 0.7%. In other more preferred embodiment, the carbohydrates correspond to natural starch present in a proportion from 1.4 to 2.5%, and xanthan gum present in a proportion from 0.1 to 0.5% and carrageenan present in a proportion from 0.01 to 0.02%, with respect to the total weight of the mixture.

In a more preferred embodiment of the first object of the present invention, the doughy homogeneous mixture of the present invention is characterized by the edulcorants from natural origin, organic and non-organic source present in a proportion between 0.1 to 5.0%; and the essential oils of the fruits are present in a proportion between 0.01 to 0.05% regarding the total of the mixture.

In a more preferred embodiment of the first object of the present invention, the doughy homogeneous mixture having 100% natural, organic, or non-organic ingredients, is characterized by the fresh fruits present in a proportion of 80%, water is present in a proportion of 12%, salt is present in a proportion of 3.0%, the carbohydrates correspond to natural starch present in a proportion of 2.0%, and xanthan gum present in a proportion of 0.3%; natural preservatives correspond to lactic acid present in a proportion of 0.7% and acetic acid present in a proportion of 0.5%. In a more preferred embodiment of the first object of the present invention, the doughy homogeneous mixture having 100% natural, organic, or non-organic ingredients, is characterized by the fresh fruits are present in a proportion of 80%, water is present in a proportion of 12%, salt is present in a proportion of 3.0%, carbohydrates correspond to natural starch present in a proportion of 2.0%, and xanthan gum present in a proportion of 0.3%; natural preservatives correspond to lactic acid present in a proportion of 0.7% and acetic acid present in a proportion of 0.5%; natural edulcorant corresponds to sugar present in a proportion of 1.4%; and the essential oils of the fruits are present in a proportion of 0.03% regarding the total of the mixture.

In a preferred embodiment of the second object of the present invention, the doughy homogeneous mixture having 100% natural, organic, or non-organic ingredients, is characterized by the fresh fruits and dehydrated fruits are present in a proportion from 60 to 70%, water is present in a proportion from 25% to 35%, salt is present in a proportion from 2.5 to 4.0%, the carbohydrates are present in a proportion from 1.5 to 3.0%, and the natural preservatives are present in a proportion from 0.5 to 1.5%.

In a more preferred embodiment of the second object of the present invention, the doughy homogeneous mixture having 100% natural, organic, or non-organic ingredients, is characterized by the fresh fruits and dehydrated fruits are present in a proportion from 60 to 70%, water is present in a proportion from 25% to 35%, salt is present in a proportion from 2.5 to 4.0%, carbohydrates correspond to natural starch present in a proportion from 1.4 to 2.5%, and xanthan gum present in a proportion from 0.1 to 0.5%; natural preservatives correspond to lactic acid present in a proportion from 0.5 to 0.9% and acetic acid present in a proportion from 0.4 to 0.7%. In other more preferred embodiment of the second object of the present invention, carbohydrates correspond to natural starch present in a proportion from 1.4 to 2.5%, xanthan gum present in a proportion from 0.1 to 0.5% and carrageenan present in a proportion from 0.01 to 0.02%, regarding the total weight of the mixture. In a more preferred embodiment of the second object of the present invention, the doughy homogeneous mixture of the present invention is characterized by the edulcorants from natural, organic and non-organic source are present in a proportion between 0.1 to 5.0%; and the essential oils of the fruits are present in a proportion between 0.01 to 0.05% regarding the total of the mixture.

In a more preferred embodiment of the second object of the present invention, the doughy homogeneous mixture having 100% natural, organic, or non-organic ingredients, is characterized by the fresh fruits and dehydrated fruits are present in a proportion of 70%, water is present in a proportion of 23%, salt is present in a proportion of 3.5%, carbohydrates correspond to natural starch present in a proportion of 2.0%, and xanthan gum is present in a proportion of 0.2%; the natural preservatives correspond to lactic acid present in a proportion of 0.8% and acetic acid is present in a proportion of 0.5%.

In a more preferred embodiment of the second object of the present invention, the doughy homogeneous mixture having 100% natural, organic, or non-organic ingredients, is characterized by the fresh fruits and the dehydrated fruits are present in a proportion of 69%, water is present in a proportion of 23%, salt is present in a proportion of 3.0%, carbohydrates correspond to natural starch present in a proportion of 2.0%, and xanthan gum present in a proportion of 0.2%; natural preservatives correspond to lactic acid present in a proportion of 0.8% and acetic acid present in a proportion of 0.5%; natural edulcorant correspond to sugar, present in a proportion of 1.4%; and the essential oils of the fruits are present in a proportion of 0.05% regarding the total of the mixture.

The person skilled in the art will understand that the proportions of each one of the essential components of the mixture, as well as those optional, may varied between the ranges established in the present invention, in such a manner that always 100 percent is completed for the total of the mixture.

Material Raws The following correspond to some general aspects of the raw material used for preparing a garlic doughy homogeneous product, as those of the present invention:

White Garlic Cloves

Fresh *Allium sativum* bulbs, insect and fungus-free; enhanced sulphidrous flavor; and garlic characteristic odor and color.

Salt:

Table salt for human consumption (Sodium Chloride "NaCl") is a white crystalline solid, hygroscopic, highly soluble in water. It is produced from evaporating and crystallizing natural salt sources, or by sun evaporating marine water.

Powdered Dehydrated Garlic

Product obtained from dehydrating and milling mature and clean fruits of *Allium sativum*.

Natural Starch:

Corn starch produced by means of the humid milling process; chemically is a carbohydrate of food degree, free of toxic and harmful substances. Nevertheless, starch from any vegetal variety may be used Lactic Acid:

It is used as a pH buffer, bacteriocidal agent, acidulator and food preservative. Its dosing depends on the product to be used. It is produced by means of sugar fermentations.

Acetic Acid:

It is a corrosive, colorless liquid with odor characteristics and strongly acid taste. It is entirely water soluble, alcohol, ether and benzene. It is produced by aerobic fermentation of ethyl alcohol, by using *Acetobacter* Sp, and then it is filtered and concentrated by distillation. The biotechnological process makes the final product, acetic acid, to be a highly pure natural one.

Xanthan Gum:

It is a powder produced by fermenting carbohydrates by using *Xanthomonas campestris* bacteria, suitable for its use in foods and food preparations as stabilizing agent, thickener or emulsifying agent.

Garlic Essential Oil:

Product obtained by dispersing the oily resin of garlic in an aqueous media.

Carrageenan:

It is a natural hydrocolloid, extracted from several Rhodophyceae algae types. The chemical structure depends on the species used and the conditions of the process.

Due to its molecular charge, carrageenan can be extracted and refined in different ways for obtaining different products. It is used as stabilizer, thickener or gelling agent in a variety of applications, mainly in the food industry; providing thus an optimal a specific texture.

Acetic and lactic acids from 100% natural source, are used in the suitable proportion, allowing the products not to be affected in their sensorial properties; and they performs a microbial protection effect due its low pH, since pastes originally have a pH of approximately 5.0, and with the addition of acetic acid (0.4%-0.7%) and lactic acid (0.5%-0.9%), life span may be extended up to one year or more, without showing microbiological, physicochemical and sensorial changes. Thus, when final pH values are obtained lower than 4.6, the combination of acetic acid and lactic acid inhibits the microbial growth in normal conditions of storing.

In order to determine the above percentages, tests they were carried out at different concentrations with each acid, and by means of stability tests in a chamber at 35° C. and 55° C., with relative humidity greater than 75% during 90 days: according with the results obtained it shows that the doughy products of the present invention ensures a life span of one year, as it is shown by stability data illustrated below.

Example of One Product of the Invention

As follows, it is described a preferred composition for a garlic seasoning product as those of the present invention exhibits the advantages desirables for the consumer.

| Components | % |
| --- | --- |
| GARLIC | 56.00% |
| WATER | 33.27% |
| SALT | 3.00% |
| POWDERED DEHYDRATED GARLIC | 4.00% |
| NATURAL STARCH | 2.20% |
| LACTIC ACID | 0.50% |
| ACETIC ACID | 0.70% |
| XANTHAN GUM | 0.30% |
| GARLIC ESSENTIAL OIL | 0.03% |
| CARRAGEENAN | 0.00% |
| TOTAL | 100.00% |

Once prepared the above garlic product, diverse laboratory tests were performed in order to demonstrate the surprising stability advantages, life span and organoleptical properties of said product. The results are as follows

| PHYSICOCHEMICAL RESULTS—DOUGHY GARLIC—DOY PACK | | | | | | | |
| --- | --- | --- | --- | --- | --- | --- | --- |
| FINAL °BRIX | CONSISTENCY | ODOR | COLOR | FLAVOR | AW | T (° C.) | VISCOSITY |
| 16 | 8.0 | Characteristic of garlic | Beige pale | Sulphidrous Enhanced | 0.96 | 25.1 | 20600 Cp −22.9° C. −5 rpm |
| °BRIX NON EVAPORATED | CONSISTENCY | ODORNESS | COLOR | FLAVOR | AW | T (° C.) | |
| 16.6 | 9.0 | Characteristic of garlic | Beige pale | Sulphidrous Enhanced | 0.96 | 25.1 | |
| °BRIX EVAPORATED | CONSISTENCY | ODORNESS | COLOR | FLAVOR | AW | T (° C.) | |
| 18 | 9.0 | Characteristic of garlic | Beige pale | Sulphidrous Enhanced | 0.96 | 25.1 | |

Stability tests were carried out in a chamber at 35° C., and 55° C., with relative humidity greater than 75%, during 90 days. Results are strong to demonstrate that the doughy mixtures of the present invention are highly desirable and secure a one year life span. Additionally, sensorial tests were performed by a group of experts, who corroborated that the products of the present invention shows optimal sensorial properties related with flavor and aroma as compared to the same fresh fruits.

Another object of the present invention corresponds to a process for obtaining a doughy homogeneous mixture having 100% natural, organic, or non-organic ingredients as food seasoning of the present invention, characterized by comprising the following steps:
  (i) Reception of raw materials, weighting and washing;
  (ii) Homogenizing micro ingredients and fresh fruits and/or dehydrated;
  (iii) Thermal treatment;
  (iv) Pumping mixture;
  (v) Packaging; and
  (vi) Thermal Shock.

In a preferred embodiment, the process for preparing the product of the present invention is characterized by the fact that the fresh fruits can be subjected to certain preliminary treatments before its homogenization in step (ii), depending upon the fresh fruit to be used.

Thus, in a one preferred embodiment of the present invention, the process is characterized by the fresh fruits useful in the mixture of the present invention may be scalded.

In other preferred embodiment of the present invention, the process is characterized by the fresh fruits useful in the mixture of the present invention, can be subjected to a skinning treatment, as it is the case of oregano and thyme.

In other preferred embodiment of the present invention, the process is characterized by the fresh fruits useful in the mixture of the present invention can be subjected to a cutting treatment, as it is the case of basil.

In other preferred embodiment of the present invention, the process is characterized by the fresh fruits useful in the mixture of the present invention which can be subjected to a scalding and skinning treatment, as it is the case of garlic.

In other preferred embodiment of the present invention, the process is characterized by the fresh fruits useful in the mixture of the present invention which can be subjected to a scalding and cutting treatment, as it is the case of onion and cayenne pepper.

The above specific embodiments can be summarized in the following table as illustrative way for some fresh fruits used in the mixture of the present invention:

| Fruit | Washing | Scalding | Cutting | Skinning |
| --- | --- | --- | --- | --- |
| Garlic | X | X | | X |
| Onion | X | X | X | |
| Cayenne pepper | X | X | X | |
| Thyme | X | | | X |
| Basil | X | | X | |
| Oregano | X | | | X |

Process for Preparing Doughy Garlic

The following is a brief description of the process for preparing a garlic product as the present invention, from which a scheme chart is shown:
  1. RECEPTION OF RAW MATERIAL, WEIGHTING AND WASHING: In this stage of the process, the material raw corresponding to white garlic fruit with odor and flavor characteristic as mature fruit, soil cleaned, dried peels, without root, green stem, bruises or misuses, fungus, dark colors, total absence from arthropods or any other pest, is received. These fruits are weighted and washed.
  2. WEIGHTING MICRO INGREDIENTS: In this stage, micro ingredients are weighted and verified in order to schedule a production batch against the standard formulation. The condition of the raw material as well as the package, presentation, labeling, validity of the expiring date, total absence of odor, color and inappropriate material of the product must be checked.

3. SCALDING: this step is performed for some fresh fruits in which a thermal treatment is carried out with steam and water, in order to inactivate enzymes, fixing the color and decrease the microbial charge. The temperature of the scalding process should be ranging between 80° C. and 90° C. during 12 and 18 minutes (equipment used: opened scalder). This technique is used for fruits such as garlic, onion and cayenne pepper.

4. SKINNING: this step is used for some fresh fruits in which the peel is (cellulose portion and fiber) from garlic and the pulp is extracted. In this stage, 15 liters of water from the total process are added (equipment used: skinning sieve 1 mm to 4 mm). This technique is used for fruits such as garlic, thyme and oregano.

5. CUTTING: This step of the process is used for some of the fresh fruits wherein the fruits are added whole or cut in big sizes to convert them in small pieces during 1 to 5 minutes of exposure, until reaching particles lower than 7 mm. This technique is used for fruits such as onion and cayenne pepper.

6. HOMOGENIZATION OF MICRO INGREDIENTS AND FRUITS: In this step are added and mixed all the ingredients of the production batch with the amount of water corresponding to the formulation and subtracting from the amount of water used in the skinning process. Homogenization time: 5-8 minutes, room temperature 20-25° C. average in the plant. Equipment used: compact process unit having 2 stirrers upper and lower of centripetal and centrifuge action, respectively, and worked simultaneously. Water is added to the equipment gauging its volume and following the addition of each one of the ingredients: water (200 liters), carrageenan, dehydrated garlic, salt, garlic, garlic essential oil and it is completed with water of the formulation. This crude mixture should register the soluble solids indicated in the technical chart for each product. See table of physicochemical results for garlic paste in Doypack package, in Brix degree without evaporation, as illustrated above.

7. THERMAL TREATMENT: Process carried out by means of steam heating through 2 jackets upper and lower, and stirring, and permanent scraping reaching a temperature between 90° C. and 93° C. maintained during 4 to 7 minutes in order to destroy the microorganisms without changing the composition and qualities of the product. Once time is completed, the steam supplying is suspended. At this time, the process for preparing the mixture is finished which should measure the established soluble solids. See table of physicochemical results for garlic paste in Doypack package, in Brix degree evaporated, as illustrated above.

8. PUMPING: The obtained mixture is pumped to the storage tank of the corresponding filling line, which must be previously pre heated with its lower jacket; pumping should be made with constant stirring in both tanks; once the product is pumped, recovering steam should be provided and keeping the lower jacket at a temperature between 82° C. to 86° C. in the storage tank.

9. PACKING: To open the lower valve of the container storage tank to fill the release pipe to the machine nozzle, and verifying the inlet temperature by draining in containers or buckets until reaching a reading of 82° C. or greater. At this time, the packing is started achieving temperature records in packing centers of minimum 80° C. to the outlet of the packing machine.

10. THERMAL SHOCK: A suspension process of the temperature between 80 and 85° C. until it decreases to 30° C. to 35° C., it is performed at the higher speed as possible, in order to improve the microbiological quality.

11. QUARANTINE: In this step, the product is stored during 5 days, in which microbiological and physicochemical analysis are carried out, in order to verify and validate if the quality parameters required are fulfilled.

12. PACKING: The package is labeled with the batch and the expiring date as follows: Batch: two first numbers corresponding to the production day, next two digits corresponding to the production month, the last two numbers corresponding to the production year, these numbers go along with the consecutive number of the batch. Expiring date: the first two digits corresponding to the expiring date; next two digits corresponding to the expiring month, the last two numbers corresponding to the expiring year.

For the flexible packages line, the packaging process is carried out in its corresponding corrugated board.

13. STORAGE AND DISTRIBUTION: The final product is stored in the distribution center duly identified at suitable rotation until the time of dispatching to the final consumer.

Therefore, the process of the present invention makes it possible to prepare doughy products subject of the present invention to be conserved by means of the synergy, in the proportions found for the acetic acid and the lactic acid, which guaranties acceptable levels of quality prolonging the life span up to 12 months, without physicochemical, sensorial or microbiological alterations.

Advantages of the Invention

Particularly, the advantages of the doughy seasoning product having 100% natural, organic and non organic ingredients subject of the present invention, may be based on the following considerations as compared with conventional seasoning products:

The product of the present invention contains natural preservatives, which allows preventing the microbiological risk of doughy products by replacing the artificial preservatives entirely.

Due to its ingredients, 100% natural, organic or non-organic products, it is possible to label the product as 100% natural, organic, and non-organic ingredients, which is highly desirable for the consumer.

The product of the present invention exhibits sensorial characteristics desirable for the consumer.

The product does not require refrigeration before being opened.

The products of the present invention exhibit an extended life span up to 1 year, keeping the sensorial aspects (flavor, aroma, color and consistency) in good shape, which allows a better marketing.

Due to its doughy and homogeneous consistency, it is possible to pack the product in any package allowed for foods.

Now well, any person skilled in the art, particularly any person skilled who had access to the teachings of the present invention shall recognize without major difficulty that it is possible any modification over the product or the process disclosed therein, without their getting apart from the scope and spirit of the invention. For instance, it would be recognized it may be used any variety of components that comply with the purposes of the invention. Consequently, all of the embodiments and variations exposed in the present invention should not be taken as limitations of the scope of the invention, which is defined by the contents of the following claims.

The invention claimed is:

1. A food seasoning mixture with 100% natural ingredients comprising:
   fresh garlic, onion, coriander, cayenne pepper, thyme, basil, oregano, scallion, tarragon, rosemary, chili and mixtures thereof in an amount of 75 to 85% with respect to the total weight of the mixture;
   water present in an amount of 10 to 15% with respect to the total weight of the mixture;
   salt present in an amount of 2.5 to 4.0% with respect to the total weight of the mixture;
   carbohydrates of natural starch, xanthan gum and carrageenan, the carbohydrates being present in an amount of 1.5%-3.0% with respect to the total weight of the mixture; and
   natural preservatives selected from lactic, acetic, citric, or ascorbic acid present in a proportion of 0.5% to 1.5% with respect to the total weight of the mixture;
   wherein the pH of the food seasoning is less than 4.6 and wherein the food seasoning is formed by homogenizing the natural ingredients in a single step to form a paste, wherein the homogenization step is carried out for 5 to 8 minutes at a temperature between 20-25° C., wherein the food seasoning is heated between 90 to 93° C. for 4-7 minutes, and wherein the food seasoning is stable for one year without refrigeration.

2. The food seasoning mixture according to claim 1, which further comprises natural, organic or non-organic edulcorants selected from sucrose, dextrose, fructose, and *stevia* present in an amount ranging from 0.1 to 5.0% with respect to the total weight of the mixture.

3. The food seasoning mixture according to claim 2, wherein the edulcorant is sucrose.

4. A food seasoning mixture with 100% natural ingredients comprising:
   fresh and dehydrated garlic, onion, coriander, cayenne pepper, thyme, basil, oregano, scallion, tarragon, rosemary, chili and mixtures in an amount of 60 to 70% with respect to the total weight of the mixture;
   water present in an amount of 25 to 35% with respect to the total weight of the mixture;
   salt present in an amount of 2.5 to 4.0% with respect to the total weight of the mixture;
   natural starch in an amount of 2.2% and xanthan gum in an amount of 0.3% with respect to the total weight of the mixture;
   lactic acid in an amount of 0.5% and acetic acid in an amount of 0.7% with respect to the total weight of the mixture; and
   an essential oil present in an amount ranging from 0.01 to 0.05% with respect to the total weight of the mixture, wherein the pH of the food seasoning is less than 4.6 and wherein the food seasoning is formed by homogenizing the natural ingredients in a single step to form a paste wherein the homogenization step is carried out for 5 to 8 minutes at a temperature between 20-25° C., and is heated between 90 to 93° C. for 4-7 minutes, wherein the food seasoning is stable for one year without refrigeration.

5. The food seasoning mixture according to claim 4, which further comprises natural, organic or non-organic edulcorants selected from sucrose, dextrose, fructose, and *stevia* present in an amount ranging from 0.1 to 5.0% with respect to the total weight of the mixture.

6. The food seasoning mixture according to claim 5, wherein the edulcorant is sucrose.

* * * * *